Feb. 17, 1970  A. F. ROACH, JR  3,495,694
PARKING METER
Filed July 15, 1966  2 Sheets-Sheet 1
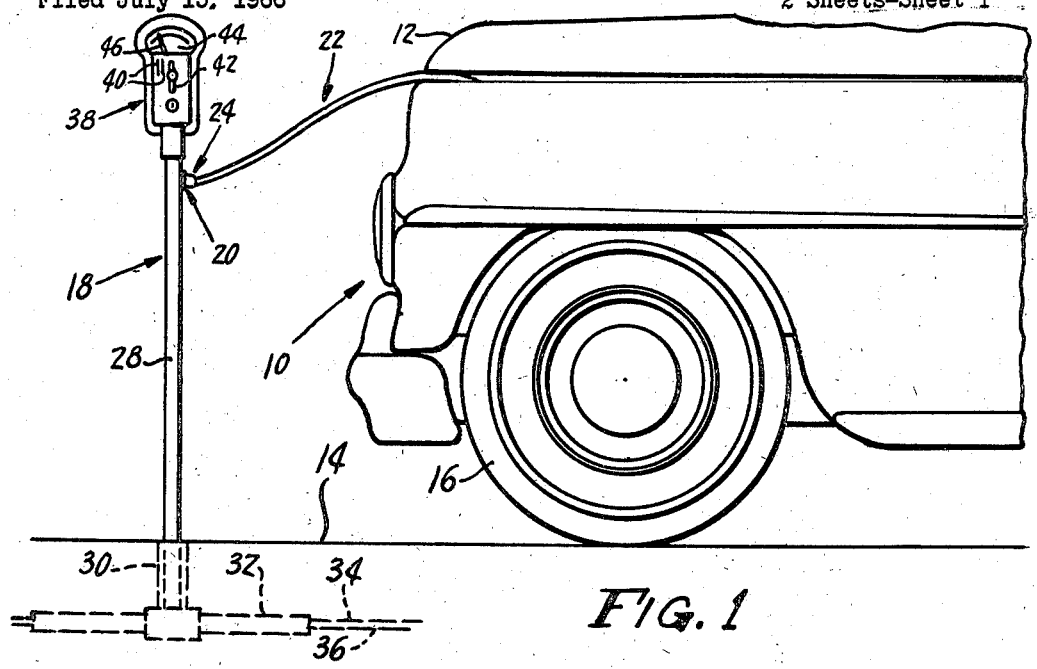
FIG. 1
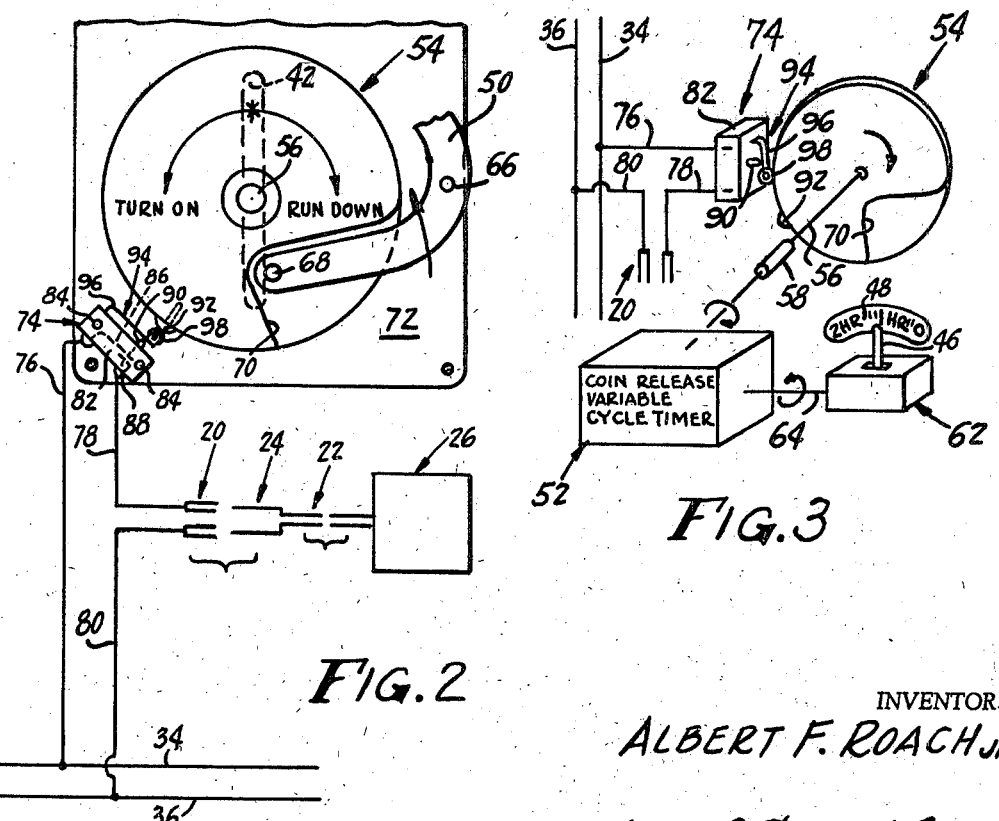
FIG. 2
FIG. 3
INVENTOR.
ALBERT F. ROACH Jr.
BY *Kimmel, Crowell & Weaver*
ATTORNEYS.

Feb. 17, 1970  A. F. ROACH, JR  3,495,694
PARKING METER

Filed July 15, 1966  2 Sheets-Sheet 2

INVENTOR
ALBERT F. ROACH,

BY Kimmel, Crowell + Weaver
ATTORNEY

United States Patent Office 3,495,694
Patented Feb. 17, 1970

3,495,694
PARKING METER
Albert F. Roach, Jr., 8325 Ohio River Blvd.,
Pittsburgh, Pa. 15202
Filed July 15, 1966, Ser. No. 565,445
Int. Cl. G07f 1/00, 3/00, 5/00, 9/00, 17/00
U.S. Cl. 194—1                                    2 Claims

ABSTRACT OF THE DISCLOSURE

An automobile parking meter of conventional design equipped with a circuit and an electrical outlet for supplying electric power to the outlet when the meter is operating is disclosed.

---

Figure 4:
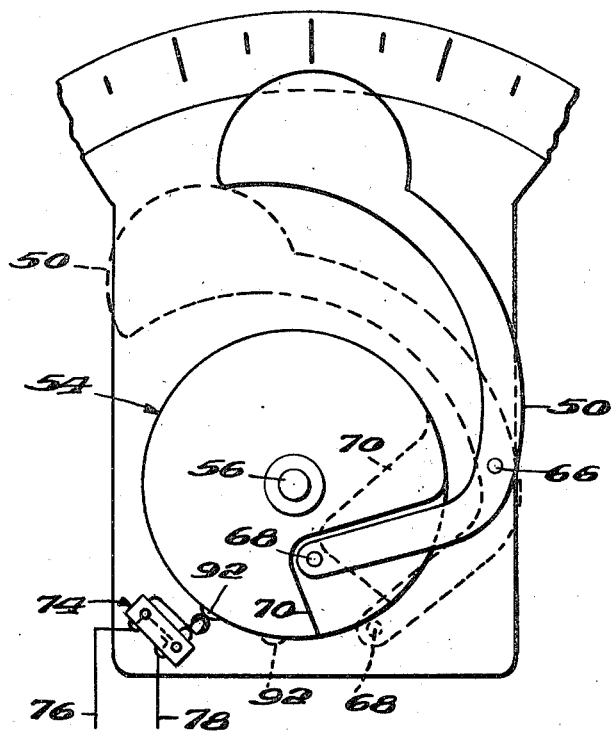

This invention relates to parking meters, and more particularly to a combined parking meter and electrical outlet in which the electrical outlet is energized by the placement of a coin in the parking meter and the actuation of the timer in the meter.

In order to explain the background or environment in which the instant invention is utilized, it should be noted that automobiles are often provided with crank case or dipstick heaters in order to warm the engine lubricant to facilitate starting when the atmospheric temperature is quite low. Normally, such heaters are capable of being utilized only where a ready source of electrical power is available, such as in one's garage or near one's home, it having been found impracticable to utilize the automobile storage battery for such purposes. It is apparent that crank case or dipstick heaters are not useful in facilitating the starting of an internal combustion engine when the vehicle is distant from a ready source of electrical energy, such as when the vehicle is parked on a city street. One object of the instant invention is to provide a combination parking meter and electrical outlet such that an individual may utilize a source of electrical energy to maintain engine temperature at an elevated level to facilitate starting.

Although there are many other advantageous uses to which the instant invention may be put, perhaps the most promising long-run use is the charging of electrical storage batteries that are used in electric vehicles, such as electric golf carts, electric automobiles and the like. Electric golf carts are, of course, presently in use and are often used by retired persons to commute to the golf course as well as for use on the golf course and for making short trips away from home. It is also understood that a considerable amount of development is presently being done to develop an electric automobile having a range of about fifty miles in order to provide a relatively inexpensive commuter's vehicle that does not contribute to air pollution problems. While it is presently contemplated that these electric automobiles will be recharged while the owner is at home during the evening, it is another object of the instant invention to provide a combined parking meter and electric outlet such that a vehicle of this type may be recharged during the daytime hours when the owner is in the city.

Still another object of the instant invention is to provide a combined parking meter and electric outlet in which the outlet is energized during at least a substantial portion of the operating cycle of the parking meter.

A further object of the instant invention is to provide a parking meter and electrical outlet in which the cyclic period of the parking meter may be controlled by the insertion of different valued coins into the meter and in which the electrical outlet is energized for periods of time proportional to the operating cycle of the parking meter.

A more specific object of the instant invention is to provide a combined parking meter and electrical outlet in which a conventional flag control wheel of the parking meter is utilized to manipulate a switch in order to cut off the flow of electrical current to the outlet.

Other objects and advantages of the instant invention reside in the combinations of elements, arrangements of parts, and features of construction and operation, all as will be more fully pointed out hereinafter and disclosed in the accompanying drawing wherein there is shown a preferred embodiment of this inventive concept.

In the drawing:

FIGURE 1 is a side elevational view of an installed parking meter of the instant invention adjacent which is parked an automobile with an electric power cord interconnecting the electric outlet of the parking meter and an electrical device in the automobile;

FIGURE 2 is a view of a timer control wheel and a switch of the parking meter of FIGURE 1 which cooperate to energize and de-energize an electrical outlet on the parking meter, the relationship between the control wheel and the switch being illustrated in the de-energized condition; and FIGURE 3 is an isometric schematic view of the parking meter of the instant invention illustrating the cooperative relationships between the timer, the timer control wheel, and the switch controlled electrical outlet, the relationship between the timer control wheel and the switch being illustrated in the energized condition;

FIGURE 4 is an enlarged view of the flag assembly and of the cam and switch assembly as shown in FIGURE 2, showing the flag assembly in greater detail.

Referring now to the drawing in detail, wherein like reference characters designate like elements throughout the several views thereof, there is indicated generally at 10 an automobile of the type having a movable hood 12 under which is positioned the customary internal combustion engine with automobile 10 being supported from a ground surface 14 by a plurality of wheels 16. A parking meter denominated generally at 18 is illustrated as adjacent automobile 10 in FIGURE 1 and includes an electrical outlet shown generally at 20, which is energized in a manner to be set forth more fully hereinafter, with a power cord shown generally at 22 having a male plug designated generally at 24 interconnecting outlet 20 with a crank case heater shown generally at 26 for warming the lubricant in the engine under hood 12 as previously mentioned. It should be understood that outlet 20 could be of the male variety with plug 24 being the female connection or that the electrical appliance associated with the instant invention is directly coupled thereto without the use of disconnectable plugs. Such appliance may be of any type and include lights, electrical appliances or other small consumers of electrical energy. In order to energize electrical outlet 20, an individual will place a coin in parking meter 18 which not only energizes the outlet 20, but which also pays for the use of the parking space.

Parking meter 18 includes a standard 28 received in a T-shaped sleeve 30 positioned under ground surface 14 with a conduit 32 being located in the cross bar of sleeve 30 and carrying a pair of conventional alternating current power lines 34, 36. A housing shown generally at 38 is positioned on top of standard 28 and houses the operating components of parking meter 18. Parking meter 18 is illustrated as a Duncan Model 50, which is a commercially available type of parking meter, with electrical outlet 20 being positioned on standard 28, although it should be understood that outlet 20 may extend through housing 38 or may be positioned on a separate standard adjacent parking meter 18.

The operation of the meter, its housing, and the interior construction thereof, are disclosed in a brochure entitled "Duncan Model 50 Housing Assemblies" and, respectively, "Duncan Model '50' Parking Meter Mechanism," both of which are published by and available from Duncan Parking Meter Division of Nautec Corporation, 835 N. Wood St., Chicago, Ill., and are dated, respectively, March 1962, and January 1962, and in United States Patent Nos. 1,799,056 and 2,070,445, the description of which is incorporated herein by reference. However, in order to briefly describe the operation of the exemplary meter, a general description of the components most closely related to the improvement herein will be discussed. It will be understood that the invention is not limited to the particular meter described, however, and may be applied to meters manufactured by the Karpark Corporation, Cincinnati, Ohio, M. H. Rhodes, Inc., Hartford, Conn., Rockwell Manufacturing Company, Pittsburgh, Pa., the Dual Parking Meter Company, a subsidiary of the Union Metal Manufacturing Company, Canton, Ohio, The Michaels Art Bronze Co., Covington, Ky., and other available meters.

Housing 38 provides a coin receiving slot or slots 40 through which an individual may place coins in order to wind handle 46 thereby actuating the interior mechanisms of parking meter 18. A transparent cover 44 exposes the conventional pointer 46 adjacent which suitable indicia 48 (FIGURE 3) may be placed to indicate the time remaining on meter 18. In addition, at least one flag 50 is mounted interiorly of housing 38 and is moved into view through cover 44 at the expiration of the operating cycle of meter 18 to indicate the end of the parking period.

As may be seen in FIGURE 3, the major operating mechanisms of parking meter 18 are a timer shown generally at 52, a control wheel designated generally at 54 drivably connected with timer 52 by drive shaft 56 in which a lost motion connection 58 is placed, a normally closed electrical switch denominated generally at 74 arranged to deliver electrical potential to outlet 20 and a motion translating mechanism shown generally at 62 connected with timer 52 by drive shaft 64 for manipulating pointer 46. The operation of these mechanisms is described in the above-named publications of the Duncan Parking Meter Corporation and, in addition, in the "Duncan-Miller Service Manual" for the Model 50 parking meter, published by the Duncan Parking Meter Corporation.

Timer 52 is set for actuation by the insertion of a coin into slot 40 and is a conventional spring-wound clock motor operatively engaged with handle 42 such that when an individual rotates handle 42, the clock spring is energized to allow the clock motor to run. Control wheel 54 is also operatively engaged with handle 42 and conventionally controls the length of the operating cycle of timer 52. After the insertion of a coin into slot 40 and the rotation of handle 42, control wheel 54 will be rotated a predetermined arcuate distance (in accordance with the value of the coin inserted in slot 40) away from the off position with timer 52 rotating wheel 54 back toward the off position at a substantially uniform rate. It will be apparent that the rotation of wheel 54 a greater extent will result in a longer operating cycle. Lost motion connection 58 is shown in FIGURE 3 to illustrate that timer 52 drives control wheel 54 but that the extent of winding of control wheel 54 is independent of the winding of the clock spring in timer 52.

Flag 50 is customarily red and carries a sign on the upper end thereof (which is broken away in FIGURE 2) indicating that the time paid for has elapsed. Flag 50 is rotatably mounted about a post 66 and is biased in the direction of the arcuate arrow in FIGURE 2 such that a cam follower 68 on the free end thereof contacts the circumference of control wheel 54 to maintain the time expired sign on flag 50 depressed out of view through transparent cover 44. When cam follower 68 comes into juxtaposition with a relieved surface 70 in wheel 54, cam follower 68 and the free end of wheel 50 may move inwardly thereof to allow the biased nature of flag 50 to raise the time expired sign such that it is visible through cover 44. Prior to rotation of the control wheel 54, the flag 50 is pivoted about point 66 to clear the cam surface on the control wheel by a mechanism not shown, which is described in the aforementioned publications and patents. The flag assembly 50 is shown in the exposed position wherein it indicates the expiration of parking time. The flag is shown, in FIGURE 4, in hatched lines in the covered position when time remains on the parking meter.

Positioned on a plate 72 adjacent control wheel 54 is a normally closed switch shown generally at 74 interconnected by one wire 76 to alternating current power line 34 with another wire 78 connected to one side of electrical outlet 20. Another wire 80, connects the other side of electrical outlet 20 to alternating current power line 36 such that switch 74 selectively delivers electrical potential thereto. Switch 74 is commercially available through the Micro Switch Division of Honeywell Inc., part No. V3-31-D8. Switch 74 includes a housing 82 secured to plate 72 by a pair of frictional fasteners 84, such as screws, rivets, nuts and bolts or the like, with a pair of stationary contacts shown schematically at 86 with a movable contact 88 being affixed to an outwardly biased plunger 90. Contacts 86, 88 are arranged such that when plunger 90 is depressed, the electrical path through switch 74 is broken whereas when plunger 90 is in the extended position, the electrical path through switch 74 is closed such that electrical potential is delivered to outlet 20.

Manipulating plunger 90 is a cam 92 affixed to the circumference of control wheel 54 and a cam follower shown generally at 94 constituting a resilient arm 96 affixed to switch housing 82 and carrying a roller 98 biased into engagement with the circumference of wheel 54. When cam 92 is spaced from roller 98, plunger 90 is biased into the extended position to close the electrical circuit leading from power lines 34, 36 to electrical outlet 20. When wheel 54 is rotated such that cam 92 contacts roller 98, plunger 90 will be depressed thereby breaking the electrical circuit and de-energizing outlet 20.

Although cam 92 is illustrated as semi-spherical, it should be understood that it may be of any desired shape, such as a wedge configuration. Cam 92 is positioned on the circumference of wheel 54 such that it contacts roller 98 when control wheel 54 shuts off timer 52 to leave electrical outlet 20 in a de-energized condition when parking meter 18 is not in use. Consequently, cam 92 is spaced away from relieved surface 70 such that flag 50 is raised shortly before the de-energization of outlet 20.

When an individual drops a coin in slot 40 and winds handle 42, control wheel 54 will be rotated in a counterclockwise direction as indicated on the "Turn On" arrow in FIGURE 2 with timer 52 being actuated to rotate control wheel 54 in a clockwise direction indicated by the "Rundown" arrow. When wheel 52 is rotating in a counterclockwise direction, it will be seen that cam 92 will be spaced from roller 98 thus allowing plunger 90 to be biased to the extended position thereby allowing a current flow through a switch 74 to energize outlet 20. At such time, outlet 20 will be energized to operate heater 26 or to operate a battery charger for the electric vehicle previously mentioned.

Although it should be understood that the instant invention may be used with any type of parking meter reference may be made to the Duncan-Miller Service Manual published by the Duncan Parking Meter Corporation covering the Model 50 meter for further information on the conventional working mechanism.

It is now seen that there is herein provided an improved parking meter and electrical outlet which accomplishes all of the objects and advantages of the instant invention and others, including many advantages of great practical utility and commercial importance.

Since many embodiments may be made of the instant inventive concept, and since many modifications may be made in the embodiment hereinbefore shown and described, it is to be understood that the foregoing is to be interpreted merely as illustrative and not in a limiting sense.

I claim:

1. A combination parking meter and electrical power dispenser which includes:

a timing motor;

coin receiving means;

means for operating the timer motor for selected lengths of time, said time lengths being controlled by the number and denomination of coins inserted in the coin receiving means;

a cam member connected for being driven by the timing motor;

at least one flag actuated by said cam member for indicating the cessation of operation of the timing motor and, consequently, the termination of allowed parking time for an automobile;

a switch secured for being operated by the cam member;

an electrical receptacle; and circuit means including the receptacle, the switch and a source of electric power, said circuit means being so connected that current is allowed to flow to the receptacle only when the timing motor is operating, current flow being controlled by the opening and closing of the switch by the cam member.

2. The combination of claim 1 further comprising a post for supporting the parking meter a distance above a sidewalk and wherein said receptacle is mounted on said post adjacent said parking meter.

References Cited

UNITED STATES PATENTS

| | | |
|---|---|---|
| 2,571,185 | 10/1951 | Bates. |
| 2,618,371 | 11/1952 | Broussard. |
| 2,810,798 | 10/1957 | Taylor. |
| 3,213,994 | 10/1965 | Hohler _____ 194—1 |
| 3,241,719 | 3/1966 | Schmaus _____ 222—70 |
| 1,799,056 | 3/1931 | Miller et al. _____ 194—72 |
| 2,070,445 | 2/1937 | Miller et al. _____ 194—72 |

ROBERT B. REEVES, Primary Examiner